United States Patent [19]

Saigh

[11] Patent Number: 5,734,891
[45] Date of Patent: Mar. 31, 1998

[54] SYSTEMS AND APPARATUS FOR ELECTRONIC COMMUNICATION AND STORAGE OF TIME ENCODED INFORMATION

[76] Inventor: Michael M. Saigh, 150 S. Price Rd., St. Louis, Mo. 63124

[21] Appl. No.: 662,272

[22] Filed: Jun. 12, 1996

Related U.S. Application Data

[63] Continuation of Ser. No. 296,120, Aug. 25, 1994, abandoned, which is a continuation of Ser. No. 787,536, Nov. 4, 1991, abandoned.

[51] Int. Cl.$^6$ .................................................. G06F 1/00
[52] U.S. Cl. ............................................. 395/610; 395/615
[58] Field of Search ........................... 364/708; 395/140, 395/144, 147, 800, 575, 775, 610, 615; 380/4, 25; 340/706, 720; 358/11, 322

[56] References Cited

U.S. PATENT DOCUMENTS

| | | |
|---|---|---|
| D. 276,626 | 12/1984 | Lockwood . |
| D. 289,777 | 5/1987 | Thomas . |
| D. 330,544 | 10/1992 | Kane . |
| D. 339,329 | 9/1993 | Lacko . |
| 4,159,417 | 6/1979 | Rubincan ............................. 235/375 |
| 4,545,023 | 10/1985 | Mizzi . |

(List continued on next page.)

OTHER PUBLICATIONS

Pobiak, "Adjustable Access Electronic Books", *IEEE*, 1992, pp. 90–94.
Dvorak et al., "A Methodolgy for User Centered Link Structures for Textbook to Hypertext Conversion", *IEEE*, 1992, pp. 619–628.
Watanabe et al., "Visual Interface for Retrieval of Electronic-formed Books", *IEEE*, 1993, pp. 692–695.
Watanabe et al; "Visual Interface for Retrieval of Electronic Format Books", IEEE Jul . 1993, pp. 692–695.
Pobiak; "Adjustable Acess Electronic Books"; IEEE Jan. 1992, pp. 90–94.
Tom Steiner–Threlkeld; "Now, Data by Satellite" No Date.
Tony Ramos, "Making Book on Electronic Books" College Store Journal—Sep./Oct. 1992.
The Heller Report–Oct. 1993.
Electronic Campus, The Wall Street Journal—Jun. 1, 1993.
This Little Computer Tries To Be A Book, St. Louis Post-–Dispatch—Jan. 4, 1995.
IBM to Unveil Plan to Skip Disks, Send Software by Satellite, The Wall Street Journal—Nov. 1994.

*Primary Examiner*—Krisna Lim
*Attorney, Agent, or Firm*—Armstrong, Teasdale, Schlafly & Davis

[57] ABSTRACT

An electronic personal library apparatus comprises a control unit, programmable memory modules selectively communicated with the control unit to supply programmed information to the control unit, programmable compact cylinders, and a compact cylinder reader that communicates electronically with the control unit. The compact cylinders are encoded with information and the cylinder reader accesses the information and provides the information to the control unit. The control unit stores portions of the information received from the cylinders in the memory modules communicating with the control unit, or displays sequential displays of the information encoded on the compact cylinders. The information network interfaces with the personal library apparatus and includes a central information storage facility that communicates with several separate book bank facilities, each at different geographic locations. The central information storage facility provides text of books, periodicals, magazines, etc. encoded on laser readable disks to the book bank facilities. The book bank facilities transfer the information encoded on the disks to the compact cylinders or memory modules. The electronic duplication of information at the point of purchase of the information, the book bank, provides the text of books, periodicals, magazines, etc. in a machine readable form that may be visually displayed by the electronic personal library apparatus.

29 Claims, 10 Drawing Sheets

U.S. PATENT DOCUMENTS

| | | | |
|---|---|---|---|
| 4,575,621 | 3/1986 | Dreifus | 235/380 |
| 4,591,974 | 5/1986 | Dornbush et al. | 395/100 |
| 4,601,011 | 7/1986 | Grynberg | 380/23 |
| 4,779,080 | 10/1988 | Coughlin et al. | 345/157 |
| 4,855,725 | 8/1989 | Fernandez | 345/173 |
| 4,899,292 | 2/1990 | Montagna et al. | 395/147 |
| 4,916,441 | 4/1990 | Gombrich | 345/169 |
| 5,065,345 | 11/1991 | Knowles et al. | 395/154 |
| 5,091,939 | 2/1992 | Cole et al. | 380/25 |
| 5,115,508 | 5/1992 | Hatta | 395/725 |
| 5,133,076 | 7/1992 | Hawkins et al. | 395/800 |
| 5,203,001 | 4/1993 | Yanagiuchi et al. | 395/800 |
| 5,221,838 | 6/1993 | Gutman et al. | |
| 5,226,080 | 7/1993 | Cole et al. | 380/25 |
| 5,319,582 | 6/1994 | Ma | 364/708.1 |
| 5,333,116 | 7/1994 | Hawkins | 364/708.1 |
| 5,388,196 | 2/1995 | Pajak et al. | 395/153 |

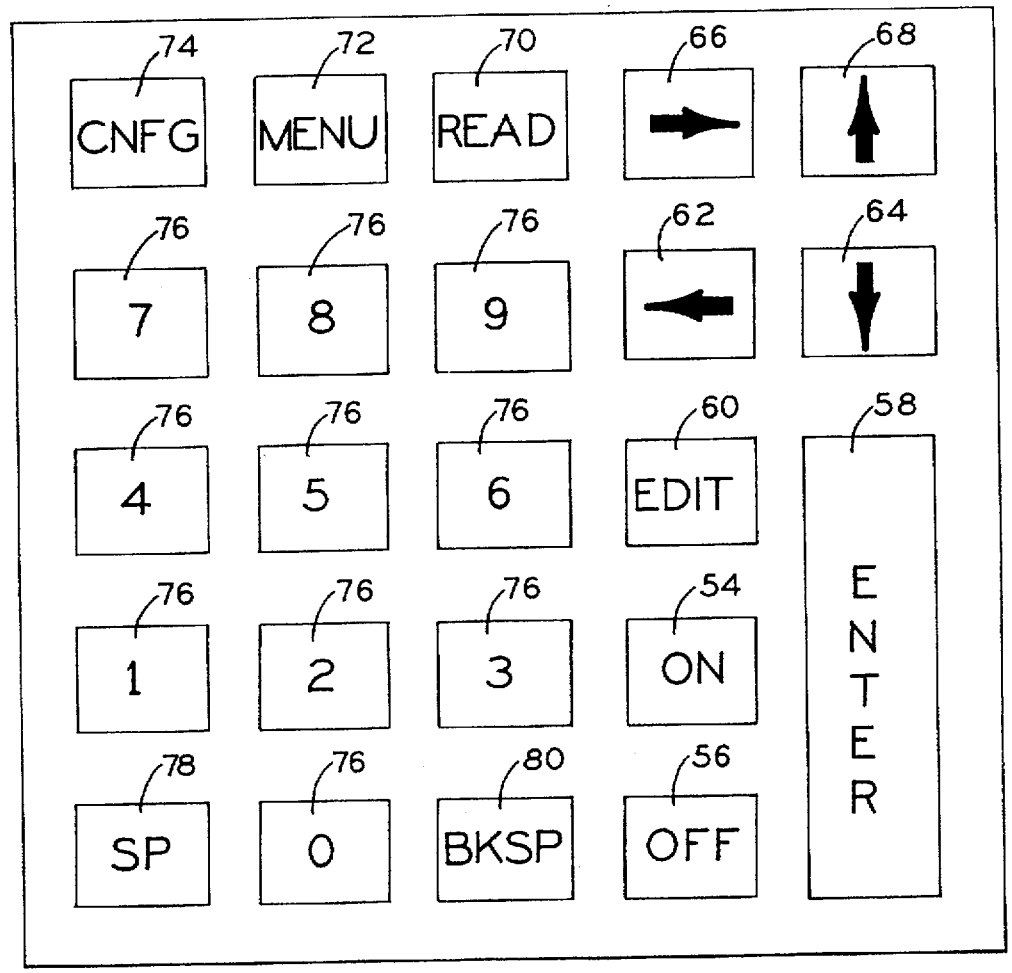
FIG_3
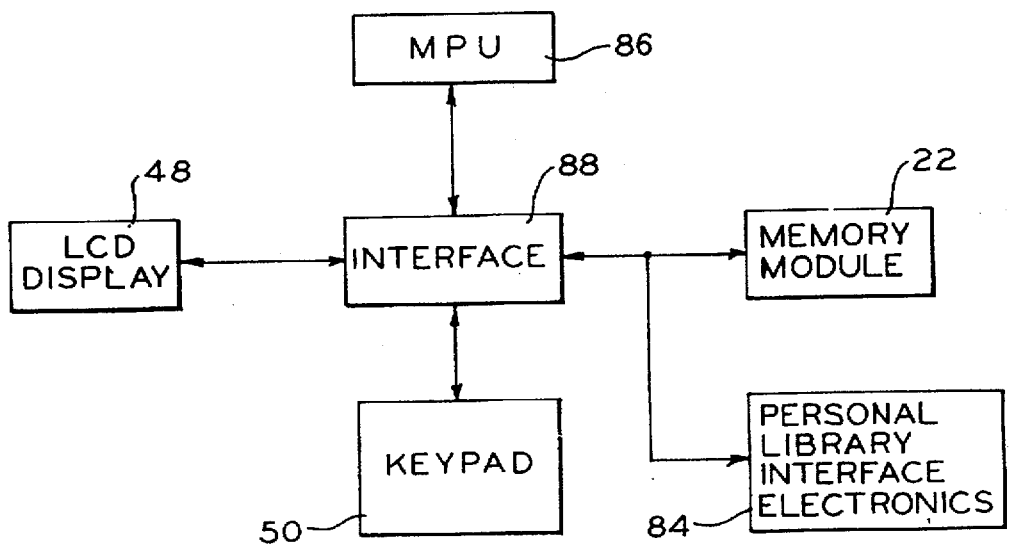
FIG_4

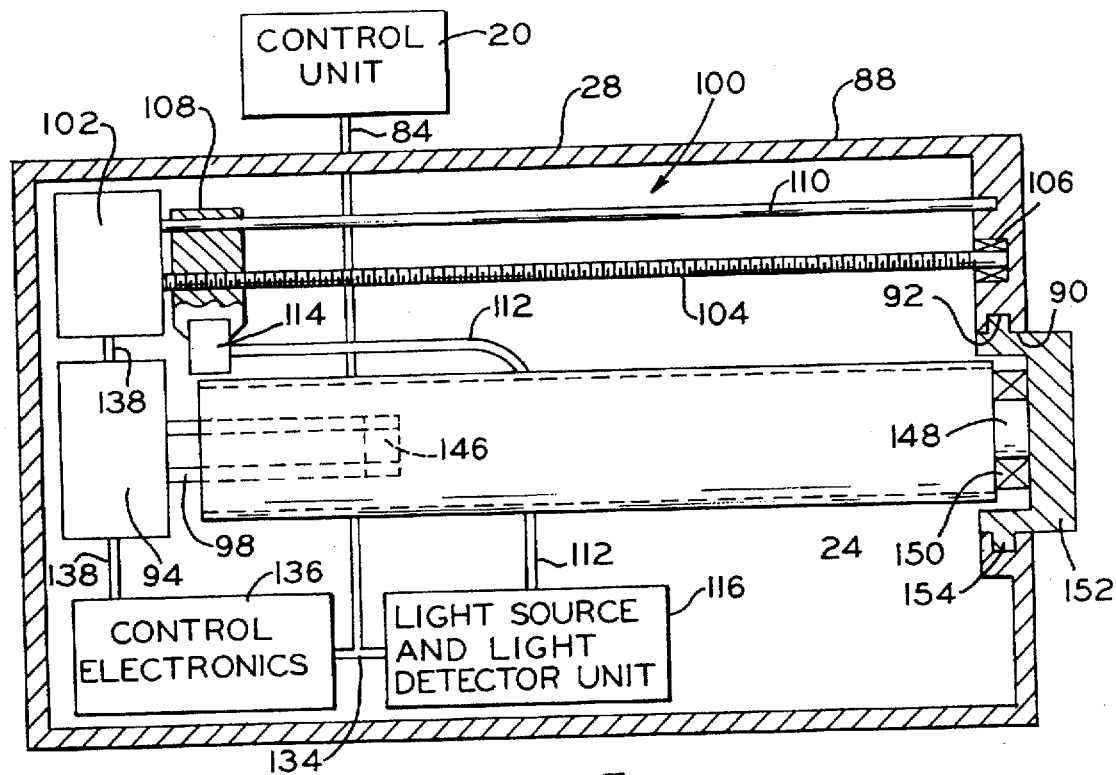
FIG_5
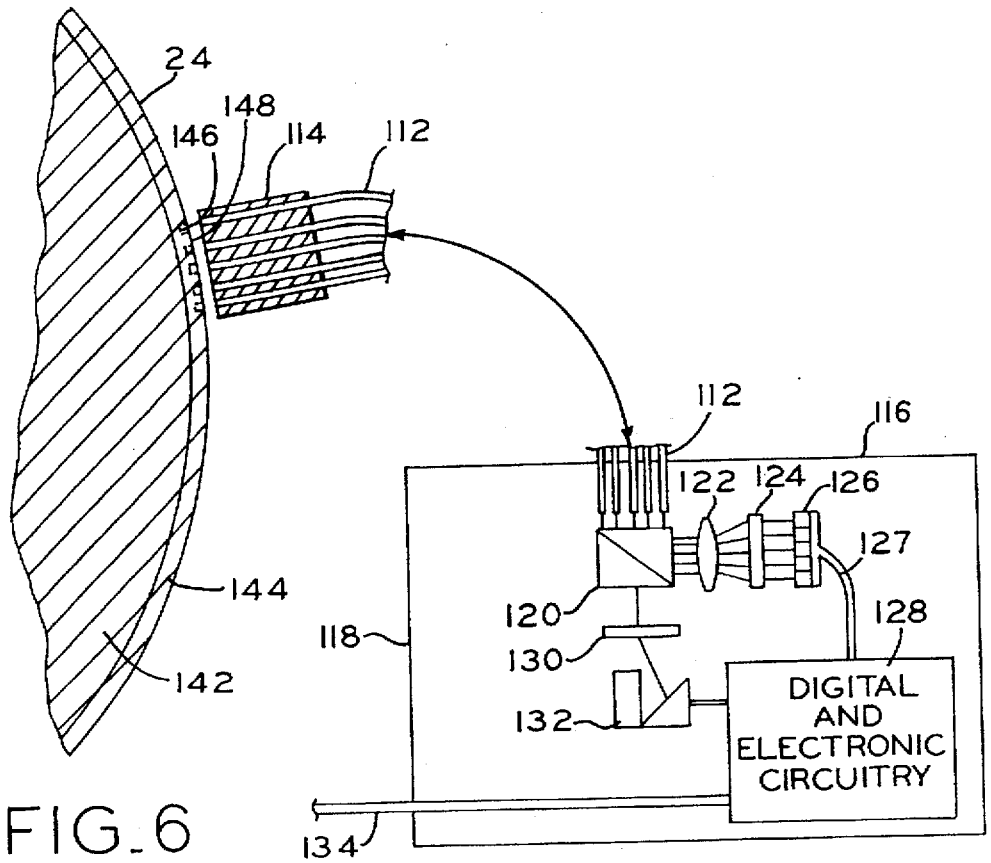
FIG_6

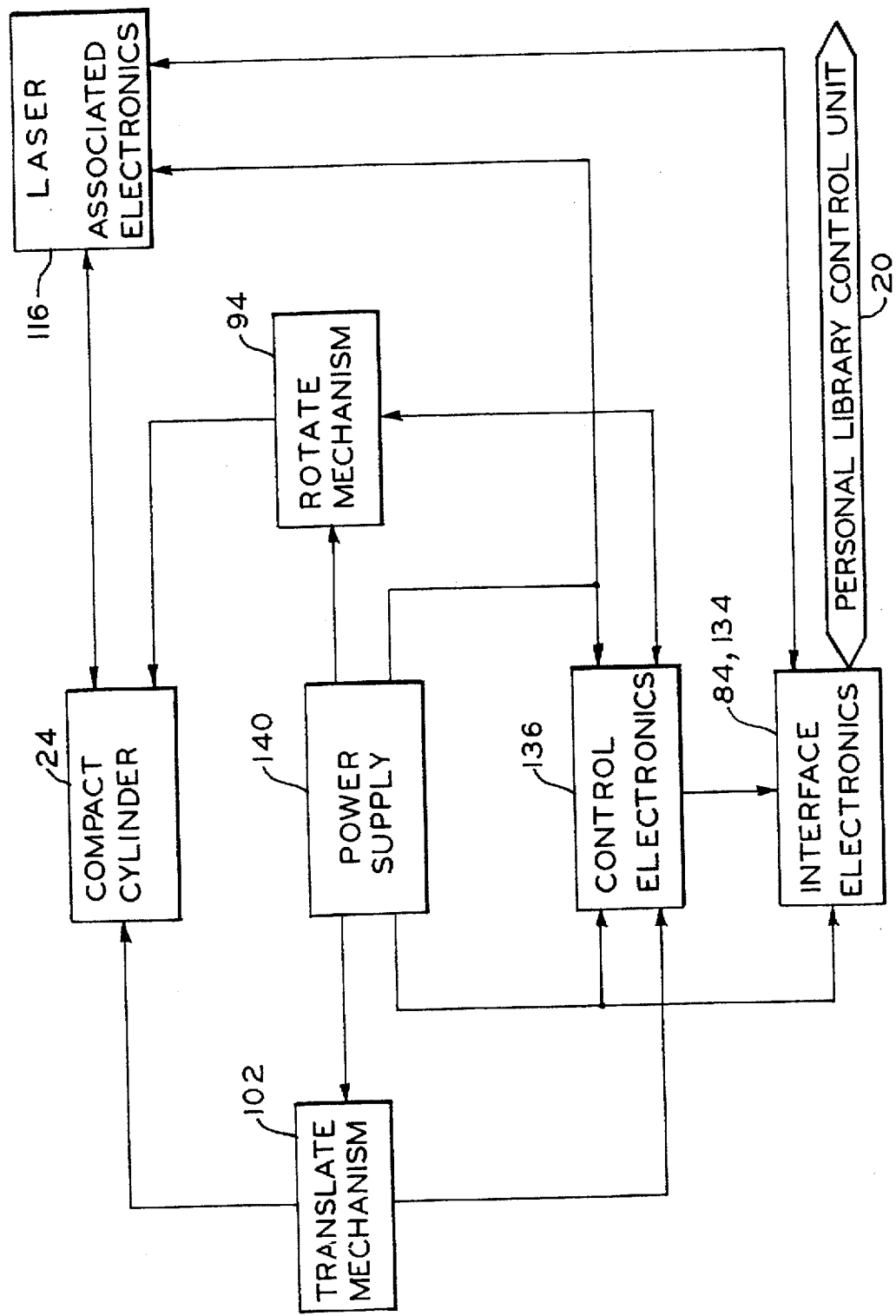

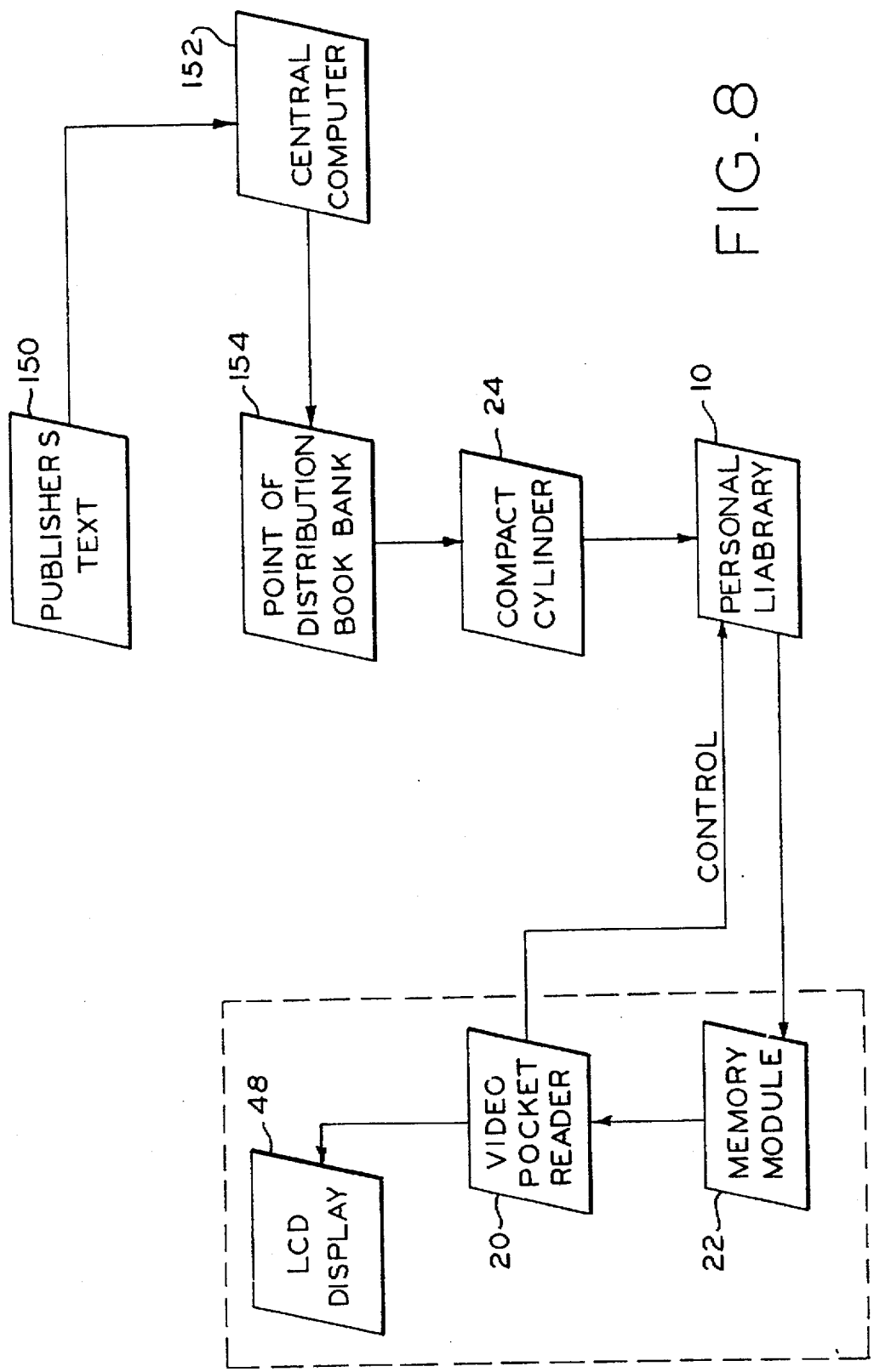

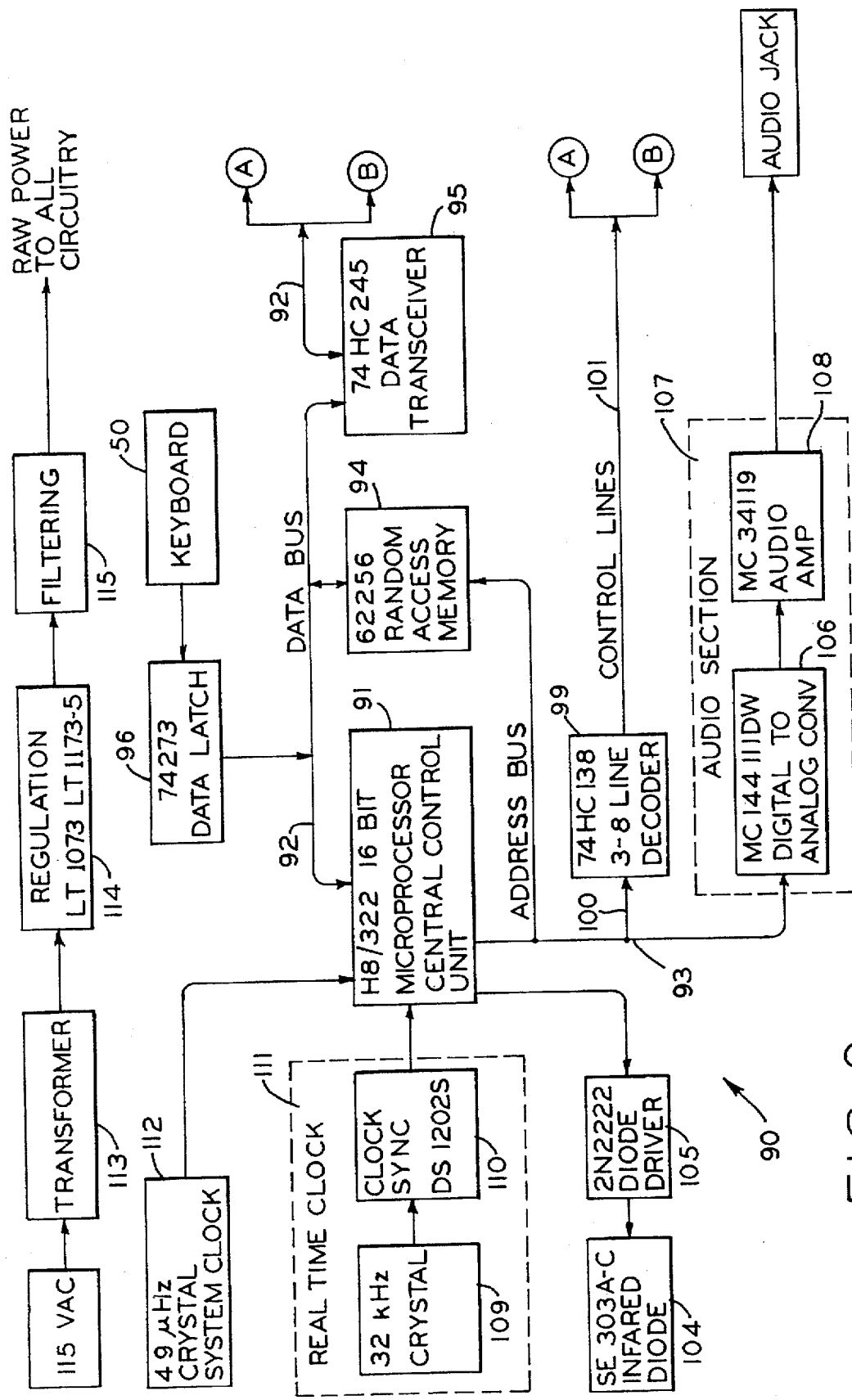
FIG_9

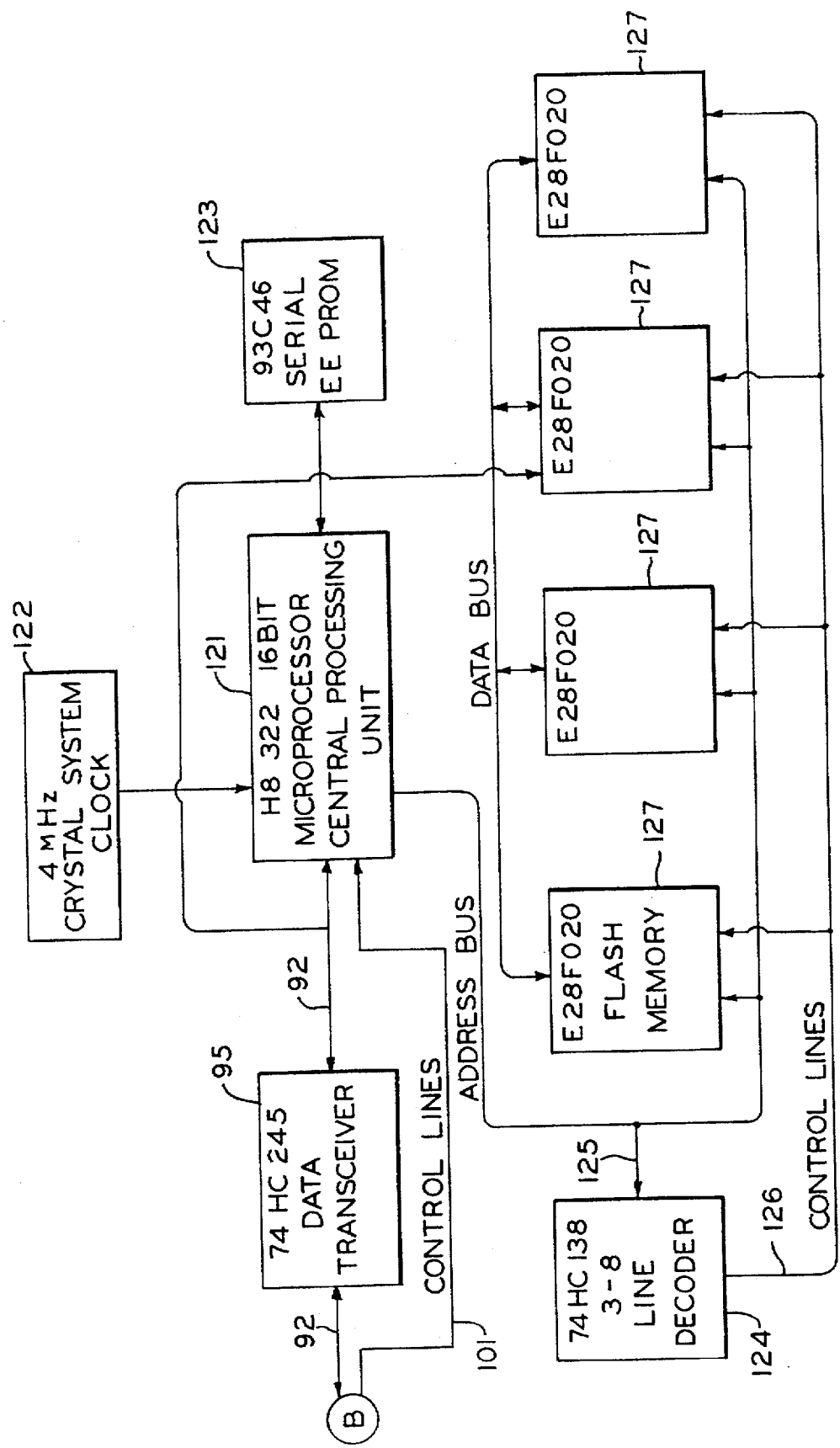
FIG_11

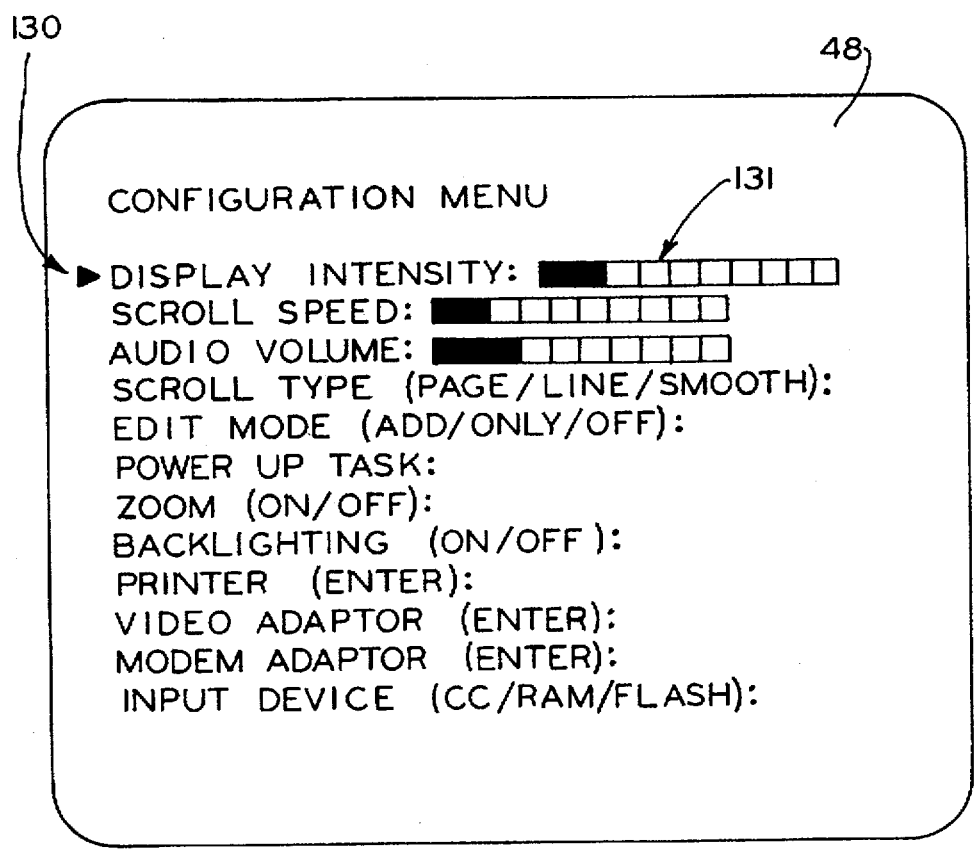
FIG_12

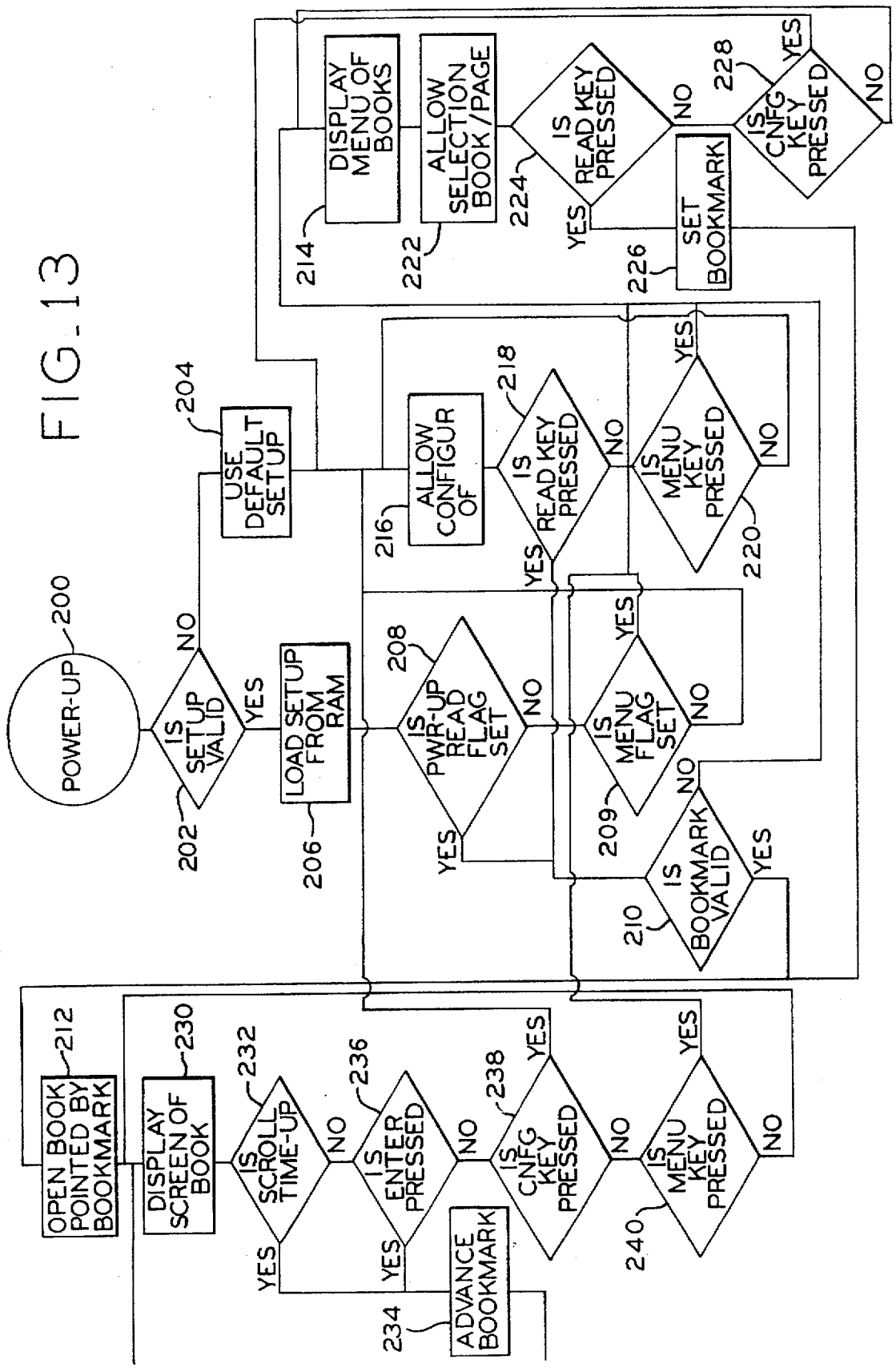
FIG._13

SYSTEMS AND APPARATUS FOR ELECTRONIC COMMUNICATION AND STORAGE OF TIME ENCODED INFORMATION

This application is a continuation of application Ser. No. 08/296,120 filed on Aug. 25, 1994, now abandoned which is a continuation of Ser. No. 07/787,536 filed Nov. 4, 1991 (now abandoned).

BACKGROUND OF THE INVENTION (1) Field of the Invention

The present invention relates to an electronic personal library and an information network that interfaces with the electronic personal library. In particular, the invention pertains to an electronic personal library comprising a control unit, programmable memory modules selectively communicated with the control unit to supply programmed information to the control unit, programmable compact cylinders, and a compact cylinder reader that communicates electronically with the control unit. The compact cylinders are encoded with information and the cylinder reader accesses the information on the cylinders and provides the information to the control unit. The control unit stores portions of the information encoded on the cylinders in the memory modules communicating with the control unit, or displays sequential displays of the information encoded on the compact cylinders.

The information network that interfaces with the personal library includes a central information storage facility at one geographic location that communicates with several separate book bank facilities each at other geographic locations. The central information storage facility provides the texts and graphics of books, periodicals, magazines, etc. encoded on laser readable discs to the several book bank facilities. The several book bank facilities transfer the information encoded on the laser discs to the compact cylinders or memory modules of the electronic personal libraries. This electronic duplication of information at the point of purchase of the information, the book bank, provides the owners of the electronic personal libraries with the texts of books, periodicals, magazines, etc. in a machine readable form that may be visually displayed by the electronic library control units and read by the owners of the libraries at their convenience.

(2) Description of the Related Art

Various compact electronic alphanumeric display devices that are controlled by microprocessors and provide manual controls for manipulation of the display are known in the art. Common among these known devices are electronic calculators, and more recently, electronic dictionaries, thesauruses and bibles. Such devices typically have all of the memory that they are capable of accessing stored internally in the hardware components of the device. These devices are disadvantaged in this respect in that they are not capable of accessing or retrieving additional information from external, interchangeable memory storage devices, and their internal memory storage limits the total amount of information that can be accessed by the device.

Electronic alphanumeric display devices that are capable of accessing information from external, interchangeable memory storage devices commonly do so at the expense of their miniaturization. Examples of these prior art devices are lap top computers and word processors. Many similar devices also access information from external, interchangeable memory storage devices, however these storage devices are programmed with information at their point of manufacture, and are not capable of being programmed at their point of purchase.

It is an object of the present invention to provide an electronic personal library apparatus that is capable of reading data stored by a separate data storage medium and visually displaying the read in data as printed alphanumeric characters and graphics on a visual display screen, where the apparatus is contained in a portable binder dimensioned to be hand held by a user of the apparatus.

It is also an object of the present invention to provide an electronic personal library apparatus that is capable of visually displaying read in data on a liquid crystal display (LCD) or some other equivalent type of flat electro luminesent (EL) display, and is also capable of sequentially displaying the read in data by scrolling the displayed lines of alphanumeric characters upward and downward a single line at a time, or by selectively changing several lines of data at a time or page at a time.

It is also an object of the present invention to provide an electronic personal library apparatus that is capable of displaying data read from a separate data storage medium accessed by the library apparatus where the storage medium is separable from the apparatus, enabling the apparatus to interchangeably access different data storage medium.

It is also an object of the present invention to provide an electronic personal library apparatus where the separate data storage medium of the apparatus interfaces with an electronic book bank and receives and stores information from the book bank, and where the information received and stored by the separate data storage medium is read from the medium and visually displayed by the electronic personal library apparatus.

It is also an object of the present invention to provide one or more book banks as part of an information network, each book bank interfacing with one or more electronic personal libraries. The book banks receive information encoded on laser discs and transfer the encoded information to the separate data storage medium of the electronic personal libraries at the point of purchase of the information.

It is also an object of the present invention to provide a central information storage facility. At the central information storage facility, information is retrieved from printed books, periodicals, magazines, etc. by a print scanning system, and is encoded in machine readable form on laser discs by a CD ROM publishing system.

SUMMARY OF THE INVENTION

The preferred embodiment of the invention includes an electronic personal library apparatus and an information network that interfaces with the apparatus.

The electronic personal library apparatus is basically comprised of a control unit having manual controls and a liquid crystal display (LCD) screen, memory modules that are separate from the control unit and are selectively communicated with the control unit to enable the control unit to access information stored in the memory modules, compact cylinders that are encoded with information from a source separate from the electronic personal library, and a cylinder reader that communicates electronically with the control unit and retrieves information encoded on the cylinders and supplies the information to the control unit and to a memory module communicating with the control unit.

The information network includes a central information processing facility at one geographic location that communicates with several separate book bank facilities at different geographic locations. Information from conventional books, periodicals, magazines, etc. is encoded on machine readable laser discs at the central information processing facility by a print scanning system and a CD ROM publishing system. The encoded laser discs are made available to the separate book bank facilities.

At the separate book bank facilities the information encoded on the laser discs is purchased by consumers and is transferred to the compact cylinder or memory module of a consumer's personal library apparatus, with several of the books, periodicals, magazines, etc. encoded on the laser discs being transferable to and stored on each compact cylinder of a consumer's personal library apparatus.

In use of the individual personal library apparatus, the compact cylinder encoded with information from a book bank facility is inserted into the cylinder reader of the consumer's personal library apparatus. By operating the manual controls of the control unit of the personal library apparatus, information encoded on the compact cylinder is transferred either directly to the control unit and displayed as alphanumeric text and/or graphics on the control unit LCD screen, or portions of the information encoded on the compact cylinder are transferred to a memory module communicating with the control unit and stored therein for later retrieval and display by the control unit.

In the above described manner, the text of several books, periodicals, magazines, etc. may be stored on each individual compact cylinder of a consumer at a book bank facility. The consumer may then later retrieve the information stored on the compact cylinder and display the information for reading on the control unit display of their personal library apparatus. Alternatively, the consumer may download a portion of the information stored on a compact cylinder to a memory module of their personal library apparatus and later view the information stored on the memory module. The control unit and memory modules are separable from the personal library apparatus so that they may be easily carried in the pocket of the individual. The information stored on the memory module may be displayed on the control unit LCD display with the control unit and memory module separated from the personal library apparatus.

BRIEF DESCRIPTION OF THE DRAWING FIGURES

Further objects and features of the present invention are revealed in the following detailed description of the preferred embodiment of the invention and in the drawing figures wherein:

FIG. 3 is a schematic representation of the keypad manual controls of the electronic personal library apparatus;

FIG. 4 is a block diagram showing the interrelationship between functional elements of the control unit of the electronic personal library apparatus;

FIG. 5 is a schematic drawing of the component parts of the compact cylinder reader module of the apparatus;

FIG. 6 is a schematic drawing showing details of several components of the reader module;

FIG. 7 is a block diagram showing the interrelationship between functional elements of the control unit and cylinder reader module of the electronic personal library apparatus; and FIG. 8 is a block diagram showing the interrelationship between functional elements of the electronic personal library apparatus and functional elements of the information network of the present invention;

FIG. 9 is a schematic block diagram of the electronic circuitry of the control unit control system of the apparatus;

FIG. 11 is a schematic block diagram of the electronic circuitry of the Memory Module of the apparatus;

FIG. 12 is a representation of the Configuration Menu display on the Liquid Crystal Display of the apparatus; and FIG. 13 is a schematic flow chart showing operations performed by the control program of the control unit of the apparatus.

DESCRIPTION OF THE PREFERRED EMBODIMENT

Figure 1:
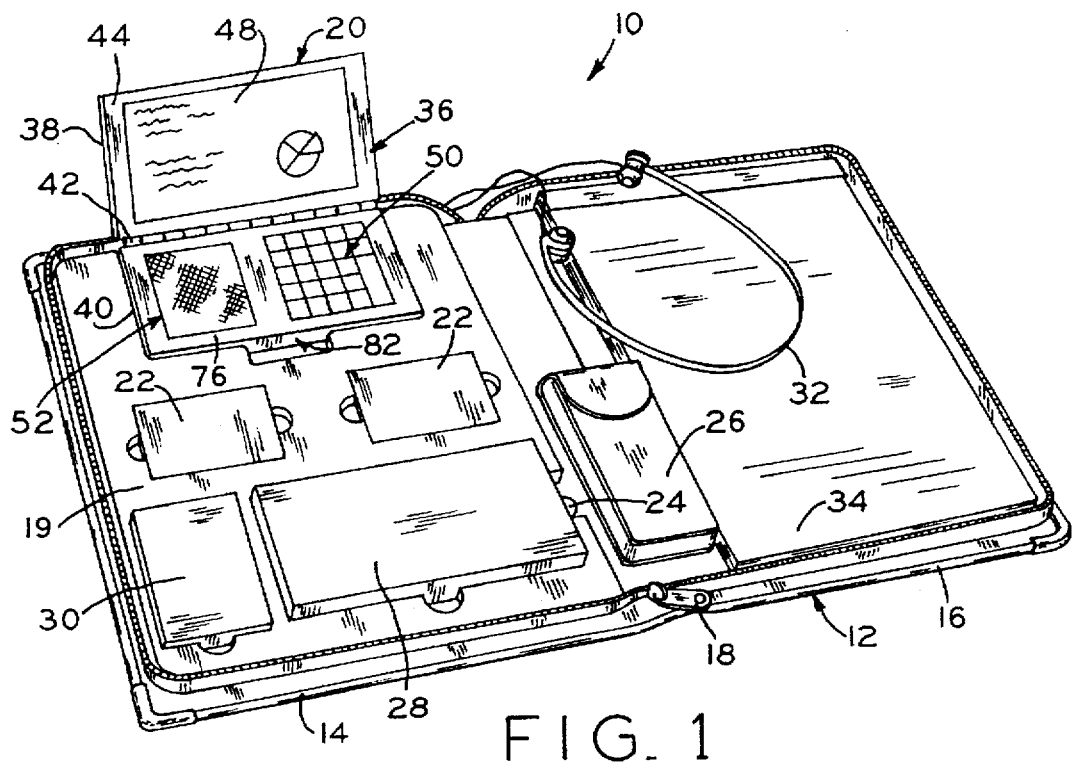
FIG. 1 is a perspective view of the electronic personal library apparatus of the present invention.
Figure 2:
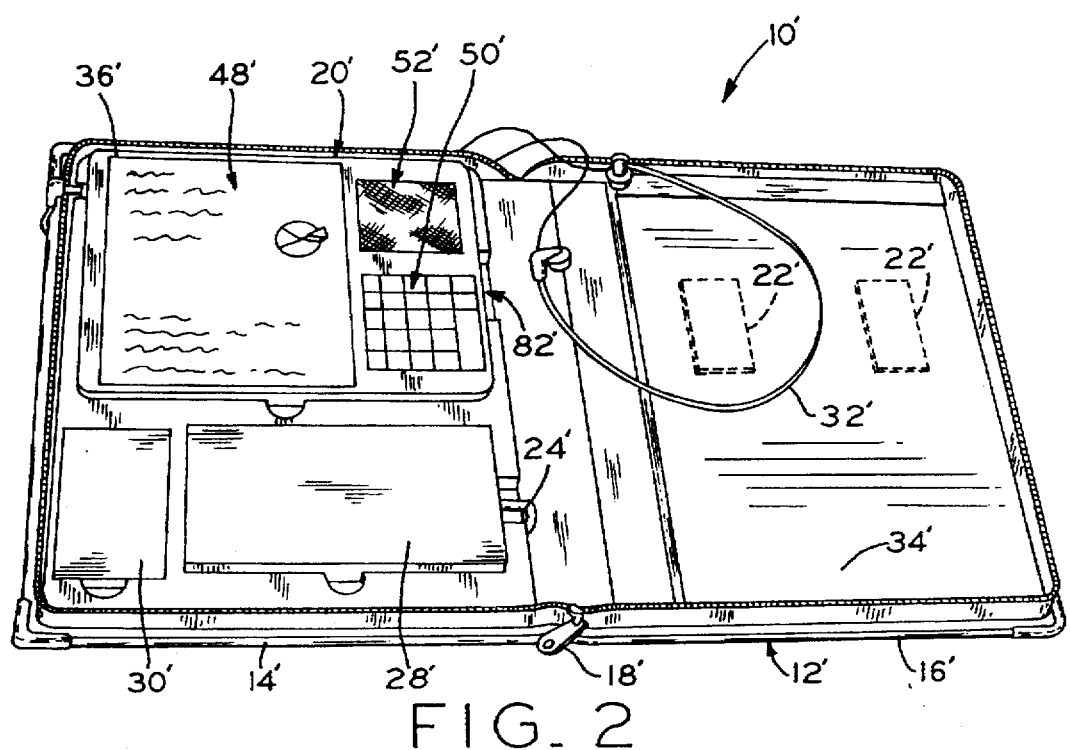
FIG. 2 is a perspective view of a second embodiment of the electronic personal library apparatus.

The electronic personal library apparatus 10 of the present invention is shown in FIGS. 1 and 2 of the drawings. In the preferred embodiment of the invention, the component parts of the apparatus are all contained in a portable notebook type enclosure 12. The notebook enclosure 12 is comprised of a left side 14 and right side 16 interconnected by a hinge binding (not shown) as is conventional. When the left and right sides of the notebook enclosure 12 are folded over on each other at the binding, the component parts of the apparatus may be enclosed between the left and right sides of the notebook enclosure 12 by a zipper fastener 18 that extends completely around three sides of the folded over notebook enclosure. The notebook enclosure is provided with a raised surface 19 on its left side, and the raised surface is provided with several recesses dimensioned to receive several of the component parts of the invention.

The component parts of the apparatus 10 include a reader control unit 20, memory modules 22, a compact cylinder (CC) 24, a case for additional compact cylinders 26, a cylinder reader module 28, a rechargeable battery pack 30, a set of head phones 32, and a writing pad 34. The cylinder reader module 28 is secured in its position on the left side 14 of the notebook enclosure in a recess formed in the raised surface 19. The other component parts of the electronic personal library apparatus 10 referred to above are all separable from the notebook enclosure.

Each of the component parts of the apparatus listed above are identically reproduced in a second embodiment of the invention shown in FIG. 2 except for the reader control unit 20. Each of these component parts of the second embodiment are given the same reference number as the corresponding part of the first embodiment except that the reference numbers are followed by a prime. The reader control unit 20' of the second embodiment of the invention differs in size from the control unit 20 of the first embodiment to accommodate a larger LCD display screen, the functioning of which is explained below. The difference in LCD screen size is the only substantial difference between the two control units and only the first embodiment of the control unit 20 will be described in detail.

In the embodiment of the invention shown in FIG. 1, the control unit 20 is designed as a hand held device removable from the enclosure 12, that is capable of reading in information from a separate programmable memory module and visually displaying the read in data as alphanumeric characters, graphs and/or drawing figures on a display screen. The reader control unit 20 is generally comprised of a housing 36 divided into first and second parts 38, 40 with a liquid crystal display (LCD) screen, several manual controls, an input for the separate memory module, and microprocessor controlled electronic circuitry contained in the housing parts. The first and second housing parts 38, 40 are connected by a hinge 42. The hinge enables the first part 38 of the housing to be folded over onto the second part 40 of the housing with a first face plate 44 of the first part mutually opposing a second face plate 46 of the second part. The first and second parts of the housing are dimensioned to enable the reader control unit 20 to be removed from the notebook enclosure 12 and hand held or conveniently carried in a clothing pocket of a user.

The LCD screen 48 provided on the first part 38 of the housing is recessed slightly below the first face plate 44. In this embodiment of the invention, the LCD screen displays a format Of several vertically spaced horizontal lines of alphanumeric characters, and/or graph or drawing figures. The screen is also capable of displaying both alphanumeric characters and graph or drawing figures on the same screen. The command instructions for displaying images on the screen are recorded among the data of a memory module and/or a compact cylinder used with the apparatus. The apparatus is also provided with manual controls 50 to control what information is read from a memory module and/or compact cylinder and how that information is displayed on the display screen.

The LCD screen 48 is also adapted to be illuminated by a light source (not shown) to enable viewing of the screen in low ambient light conditions. A separate AC power adapter (not shown) is provided to power the light source as well as the control unit 20. The light source automatically illuminates the display screen when the apparatus is used with the AC power adapter in lieu of its self-contained rechargeable DC power source 30. In a variant embodiment of the invention, the apparatus is also provided with a solar cell panel 52 that works in parallel with and assists the rechargeable batteries 30 in operating the apparatus.

The manual controls 50 are provided on the second face plant 46 of the housing. The details of the manual controls are illustrated in FIG. 3 of the drawing figures. The controls include a power on control 54, a power off control 56, an enter key 58, an edit key 60, four cursor keys 62, 64, 66, 68, a read key 70, a menu key 72, a configuration key 74, and ten numbered keys 76.

All of the manual control keys 50 are constructed and mounted on the second face plate 46 so that they are substantially flush with the face plate of the second part 40 of the housing and do not interfere with the recessed LCD display screen 48 when the first and second parts of the housing are folded to their closed position. It should be apparent from the structure of the electronic personal library apparatus components described above that when the first and second housing parts 38, 40 are folded at the hinge 42 to their closed position so that the first face plate 44 mutually opposes the second face plate 46, the LCD screen 48, the manual controls 50 and the solar panel 52 of the apparatus will be concealed and protected by the apparatus housing 36.

A plug-in interface between the reader control unit 20 and the memory modules 22 of the type having plug and jack connections is provided on a side of the control unit housing 36. A slotted recess 82 is provided in the housing of the control unit exposing connectors communicating with the microprocessor of the control unit. The slotted recess enables insertion of the memory modules 22 into the slot and connection of mating plug connectors of the memory modules with the plug connectors of the control unit, thereby connecting the inserted memory module in communication with the microprocessor of the control unit. The slot 82 is provided in a side of the housing second part 40 of the first embodiment of the control unit so that the module inserted in the slot will not interfere with the closure of the first and second parts of the unit. The plug and jack connectors of the type employed in the apparatus that enable the control unit to communicate with an inserted memory module 22 are known in the art.

FIG. 4 shows a block diagram of the electronic control system contained in the control unit 20, the interconnections of the control system with a memory module 22 inserted in the recess 82 of the control unit, and the interconnections of the control system with the personal library interface electronics 84.

The interface electronics 84 are a permanent part of the notebook enclosure and include electric wiring (not shown) that extends from the compact cylinder reader module 28 and the power source 30, beneath the raised surface 19 of the left side of the notebook 12 to a plug-in connection (not shown) positioned at the bottom of the recess in the raised left side 19 provided for the control unit 20. By insertion of the control unit 20 into the left side of the notebook 12, a plug and jack connector (not shown) on the left side of the control unit 20 as viewed in FIG. 1 is press fit into a corresponding plug and jack connector (not shown) mounted at the left side of the recess in the surface 19 provided for the control unit. In this manner, the control unit 20 is connected in direct electric communication with the compact cylinder reader module 20 and the power source 30 whenever it is inserted in the position in the notebook enclosure 12 shown in FIG. 1. When the control unit 20 is removed from the notebook enclosure, its electric communication with the compact cylinder reader module 28 and the power source 30 is interrupted. The plug and jack connectors and the electrical conductors of the type employed and described above are known in the art.

Referring to FIG. 4, the electronic control system contained in the control unit 20 is controlled by a microprocessor unit 86. An electronic interface 88 communicates the microprocessor unit 86 with the manual keypad controls 50 of the control unit, the LCD display screen 48 of the control unit, a memory module 22 plugged into the slotted recess 82 of the control unit, and, when the control unit 20 is inserted into the recess provided for the control unit in the left side of the notebook enclosure 12, the personal library interface electronics 84 communicating the control unit 20 with the compact cylinder reader module 28 and the power source.

In general, the microprocessor controlled electronic control system of FIG. 4 receives information from a memory module 22 inserted into the input slot 82 of the control unit, and/or a compact cylinder 24 inserted into the compact cylinder reader module 28, and converts the received information to the proper form and outputs the converted information to the LCD screen 48 for viewing by the apparatus operator. The functions performed by the microprocessor unit 86 of the control system are made in response to commands input by the apparatus operator through the control unit keypad 50. A more detailed explanation of the manner in which the microprocessor unit 86 of the control unit control system operates to display information on the LCD screen 48 is presented later in the specification.

As stated earlier, FIG. 2 shows the second embodiment of the electronic personal library apparatus 10' of the present invention. The component parts of the second embodiment are substantially identical to those of the first embodiment shown in FIG. 1 and described above. Each of these component parts are identified by the same reference numerals employed in describing the component parts of FIG. 1, with each of the numerals being followed by a prime (') in FIG. 2. The only differences between the second embodiment of the invention and the first embodiment of the invention is that the LCD display screen 48' of the second embodiment is much larger. The increased size of the display screen enables a greater amount of information to be displayed by the control unit 20' at any one time. Because of the increased size of the LCD screen 48', the control unit of the second embodiment is not capable of folding over on itself. This also distinguishes the second embodiment from the first embodiment of the control unit. The remaining component parts of the second embodiment of the apparatus are substantially identical to those described with reference to the first embodiment of the apparatus, including the memory modules 22' stored in the notebook enclosure 12' beneath the writing pad 34'. Although not shown in FIG. 2, the second embodiment of the apparatus is also provided with a compact cylinder case for storing additional compact cylinders.

The memory module 22 is a solid state electronic memory storage device that has a programmable memory. Data may be input to the memory module by operation of the compact cylinder reader module 28 and the control unit 20, or by the book bank of the information network of the invention, both of which will be explained in detail later in the specification. Information stored in the memory module 22 is retrievable by the control unit 20 for display by the control unit on the LCD screen 48. The memory module is programmed by insertion of the module into the recessed slot 82 of the control unit, and then by operating the control unit keypad 50 to download information from a compact cylinder inserted in the cylinder reader module 28 to the memory module 22 inserted in the control unit 20.

When downloading information from a compact cylinder to a memory module, the control unit 20 effectively erases any data currently stored on the memory module and inputs new data corresponding to the particular data selected from the compact cylinder 22 by the operator of the control unit. In this manner, the same memory module 22 may be loaded and/or reprogrammed several times with the text of several different books if so desired.

The control unit 20 of the apparatus is provided with a real time clock as part of the microprocessor unit 86. Information downloaded from a compact cylinder or from a book bank to a memory module 22 may also include date and time information as to when the data was transcribed into the memory module, as well as information regarding a set time period after which the information transcribed in the memory module will be automatically erased. The programmed set time period is compared to the control units real time clock and if the set time period has elapsed, the control unit will automatically cause the data downloaded to the memory module to be effectively erased. The real time clock of the control unit microprocessor 86 can be used in several ways, including lending library applications where the textural material programmed into a memory module 22 is loaned for a predetermined period of time. The preset time periods before automatic erasure of information programmed in the memory module 22 may be set in the memory module from a book bank facility or from a compact cylinder.

The personal library interface electronics 84 shown in FIG. 4 communicate the control unit 20 of the apparatus with the compact cylinder reader module 28 as seen in FIGS. 4 and 5. Also shown in FIG. 5 are the component parts that make up the compact cylinder reader module 28.

The reader module 28 is comprised of a housing 88 having a circular opening 90 at one end. The opening is large enough to easily insert the compact cylinder 24 through the opening and into the housing. A spiralling slot 92 is provided extending into the housing 88 of the reader module around the housing opening 90. The spiralling slot 92 engages a thread of a locking key of the compact cylinder 24 which will be described in detail later in the specification.

The reader module housing 88 has a rotate mechanism stepper motor 94 mounted therein for incremental rotation of the compact cylinder 24. The stepper motor has a keyed output shaft 96 that is inserted into a complementary shaped internal bore at one end of the compact cylinder 24 to securely mount the cylinder on the motor shaft and prevent relative rotation between the compact cylinder 24 and the motor shaft 98. In FIG. 5, the output shaft 98 is shown as having a hexagonal cross section. However, other types of shaft configurations may be employed that prevent the rotation of the compact cylinder 24 relative to the stepper motor shaft 98 with the cylinder mounted on the shaft. For example, a tapered shaft that engages in a tapered bore of the cylinder may also be employed.

A linear actuator assembly 100 is also mounted in the interior of the reader module housing 88. The linear actuator assembly includes a translate mechanism stepper motor 102 that imparts selective rotation of a motor output shaft 104 having a spiralling groove formed thereon. The opposite end of the output shaft 104 from the translate stepper motor 102 is received in a bearing assembly 106 mounted in a side wall of the reader module housing.

A cylinder reader head 108 is mounted on the translate stepper motor output shaft 104 for selective linear movement in opposite directions over the output shaft as the shaft is rotated in different directions by the translate motor 102. The reader head 108 is also mounted for sliding movement over a stationary stabilizing shaft 110 supported between the translate stepper motor 102 and an end wall of the reader module housing. The stabilizing shaft 110 prevents the reader head 108 from rotating relative to the output shaft 104 as it travels linearly forward and back over the output shaft.

A bundle of fiber optic members 112 are mounted on the linear actuator reader head 108 by a support and focusing member 114. In the embodiment of the invention shown in FIGS. 5 and 6, the support member 114 supports five fiber optic members 112. In variant embodiments of the invention, more or fewer fiber optic members may be employed, and the five fiber optic members shown in the drawing figures are illustrative only of the preferred embodiment of the invention. As seen in drawing FIG. 6, the support member 114 securely positions first ends of each of the fiber optic members 112 at a set distance from the surface of the compact cylinder 24. As the linear actuator 100 of the compact cylinder reader module 28 controls the reader head 108 to move linearly from left to right over the surface of the compact cylinder 24 as viewed in FIG. 5, the support member 114 securely holds the first ends of each of the fiber optic members 112 at a set distance from the surface of the compact cylinder 24 for all positions of linear movement of the reader head 108 relative to the compact cylinder.

The pitch of the threads surrounding the output shaft 104 of the translate stepper motor 102 is very small so that a very high order of linear positioning accuracy of the fiber optic members 112 relative to the compact cylinder surface is obtainable. The translate stepper motor 102 of the linear actuator 100 is capable of imparting incremental rotation to the output shaft 104 in direct proportion to voltage applied to the stepper motor, thereby facilitating the precise relative linear displacement of the fiber optic members 112 relative to the surface of the compact cylinder 24.

The fiber optic members 112 extend from the support member 114 and communicate with a light source and light detector unit 116. The light source and light detector unit 116 is comprised of a housing 118 containing and securely supporting a non-polarizing beam splitter 120, a focusing lens 122, a quarter wave plate 124 and an array of photo detectors 126 that communicate through fiber optics 127 with an operational amplifier (not shown) of the digital electronic circuitry 128 of the light source and light detector unit 116. A second quarter wave plate 130 is also supported in the light source and light detector housing 118 adjacent the beam splitter 120. A laser diode 132 is positioned on the opposite side of the second quarter wave plate 130 from the beam splitter 120. The laser diode also communicates with the digital and electronic circuitry 128 of the light source and light detector unit 116.

The digital and electronic circuitry 128 of the light source and light detector unit 116 communicates through an electronic interface 134 with control electronics 136 of the compact cylinder reader module 88. The control electronics 136 in turn communicate with the rotate and translate stepper motors 94, 102 of the reader module through a second interface 138. The control electronics control the operation of the rotate and translate stepper motors 94, 102 in response to control signals received from the light source and light detector unit 116, and from the control unit 20 of the apparatus through the interface electronics 84 communicating the control unit 20 with the compact cylinder reader module 88.

FIG. 7 shows a block diagram representation of the electronic control system for the compact cylinder reader module 28 and other component parts of the personal library apparatus with which the reader module interacts. As seen in the drawing figure, the control unit 20 of the apparatus communicates through the electronic interface 84, 134 with the reader module electronic control system. As set forth with regard to FIG. 5, the interface electronics 84, 134 communicate the control unit 20 with the control electronics 136 of the reader module and the light source and light detector unit 116 that contains the laser diode electronics. The laser diode electronics 116 of the light source and light detector unit communicate with the compact cylinder 24 by the transmission of laser light from the laser diode electronics 116 to the surface of the compact cylinder, and the reception of reflected light by the laser diode electronics 116 from the surface of the compact cylinder 24, as will be explained later in the specification. The translate mechanism 102, including the linear translation stepper motor and the rotate mechanism 94 and the compact cylinder rotation stepper motor, are powered by a power supply 140 of the reader module 28 that is connected with the power supply 30 of the apparatus, and interact with the compact cylinder 24 in a manner that is explained later in the specification.

The compact cylinder 24 is generally comprised of a main cylinder 142 having an outer covering 144 of polymer material. The main cylinder 142 is constructed from a plastic material such as polystyrene, and has a keyed bore 146 at one end and a mounting stub shaft 148 at its opposite end. The interior of the keyed bore 146 is configured complementary to the exterior surface of the rotate mechanism stepper motor shaft 98. This enables the compact cylinder 24 to be inserted over the keyed shaft 98 and held stationary relative to the keyed shaft. The stub shaft 148 at the opposite end of the compact cylinder 24 is journalled in a bearing assembly 150 secured to a locking key 152 of the compact cylinder. The bearing assembly 150 enables the compact cylinder 24 to rotate relative to the locking key 152.

The locking key 152 is provided with a section of screw thread 154 spiralling over its circumferential surface. The screw thread 154 engages in the spiralling slot 92 provided in the opening 90 in the end wall of the reader module 28 to securely hold and support the compact cylinder 24 for rotation at the end wall of the reader module.

In inserting the compact cylinder 24 into the reader module, the bore hole end of the compact cylinder is first inserted into the end wall hole 90 and the bore hole 146 is slip fit over the end of the keyed rotate stepper motor shaft 98. As the bore hole 146 of the compact cylinder is slipped over the keyed output shaft 98, the screw thread section 154 of the cylinder locking key 152 is engaged in the opening of the spiralling groove 92 in the end wall of the reader module. The locking key is then given a one-half turn, causing the section of screw thread 154 to slide through the spiralling groove 92. The sliding of the screw thread section through the groove causes the locking key 152 to move into and securely nest in the opening 90 in the end wall of the reader module. This securely supports the compact cylinder 24 for rotation in the interior of the reader module housing 88 between the keyed rotate stepper motor shaft 98 and the bearing journal 150 of the locking key 152.

The outer layer 144 of the compact cylinder is constructed of a cross-linked polymer material such as irradiated polyolefin or other similar material. The outer layer 144 retains digital data that is transcribed in the exterior surface of the outer layer by a laser beam that is directed at a point on the outer layer, causing the outer layer to melt and puddle at the point of contact of the laser beam. The puddling of the outer layer at the point of beam contact produces an extremely small blind hole 146 in the order of less than 50 microns in diameter. The puddled material at the bottom of the hole 146 is extremely reflective to electromagnetic energy in the visual spectrum and represents a logical "1" or "true" condition, whereas adjacent areas 148 of the outer layer exterior surface are less reflective and represent a logical "0" or "false" condition in a binary mechanical array. Sequential or serial digital data is transcribed in the surface of the compact cylinder along the longitudinal axis of the cylinder in this manner.

The electronic personal library apparatus 10 is also provided with a rechargeable battery pack 30 for portable operation of the apparatus. The apparatus is also capable of being powered by an AC adapter (not shown) that is plugged into an outlet (not shown) provided on the battery pack housing 30. The AC adapter may be used to recharge the batteries or to operate the apparatus with the display screen illuminated. The display screen is automatically illuminated by the AC power source when the AC adapter is used with the battery pack 30.

The electronic personal library apparatus 10 is also provided with a separate video output jack (not shown). The video output jack enables the electronic personal library apparatus to communicate with a larger video module by way of a separate adapter that is connected between the apparatus output jack and an input of the separate video module. Connecting the electronic personal library apparatus to the video module by the adapter enables the display of data on the LCD screen 48 of the apparatus to be simultaneously, or alternatively, displayed on the larger screen of the video module. All of the functions performed by the electronic personal library apparatus 10 are performed by the microprocessor unit 86 of the control unit.

The electronic personal library apparatus 10 and the separate memory modules 22 and compact cylinders 24 are integral parts of an electronic network interfacing book publishers directly with book retail stores and their customers. This electronic network is schematically represented in the block diagram of FIG. 7. The network enables book retailers to encode data representing the printed text of books and novels on the compact cylinders 24 or memory modules 22 for sale to their customers who desire selected book titles for their electronic personal libraries.

The network begins with various book publishers 150 who have the text of their books and novels translated into a computer read language and stored in a data base at a central computer location 152. Known scanning systems for scanning printed text and graphics from books and novels and translating the printed text into a digital machine readable form are employed at the central computer location 152 to translated printed text into a machine readable format. Next, the central computer uses the text translated in machine readable format, and known CD Rom technology to produce a master laser disc containing thousands of publishers titles encoded in digital form on the disc.

The master laser discs are distributed to point of distribution book banks or retail stores 154. The master laser discs are installed at a point of purchase, PC based book bank within each of the individual retail stores 154. The book bank combines a hard drive and Winchester drive PC based machine with the storage capacity city of the master laser discs. As the publishers, 150 titles grow in number, additional master laser discs will be produced at the central computer location 152 and distributed to the retail stores 154. The CPU at the central location 152 communicates via modem telephone lines with each of the individual book bank retail stores 154 to exchange sales information and accounting information, keeping track of the publishers titles sold. The CPU at the central location 152 will also keep track of a code number assigned to each of the individual electronic personal libraries 10 for which a book is purchased.

The PC based book bank is used to retrieve the book from the laser disc memory and transcribe it on a compact cylinder 24 or memory module 22 of a book bank customer. Each of the individual compact cylinders (CC) distributed will have a personal signature code number, which is programmed into the CC at the time of initial purchase. As stated above, the book bank is also capable of transferring information from the laser discs to the memory modules 22. Typically, the memory module 22 is a miniaturized, random access memory device, with a total storage capacity of up to 64 megabits yielding as many as three separate book titles. The memory module 22 acts as a buffer memory for the library control unit 20 and as stated earlier is also transportable with the control unit.

The above described network enables an accurate accounting of the individual publishers text titles requested by customers of the individual book bank retailers 154. It also provides a large variety of book titles for sale to the customers of the individual book bank retailers without requiring the book retailers to keep a large stock of books available at their location. All that is needed is that the book bank retailers 154 keep a supply of blank memory modules and compact cylinders on hand for purchase by customers.

Customers can add more book titles to the CC at later dates as desired until the entire recording capacity is reached, at which time the customer will need to purchase an additional CC.

The network also provides a substantial savings of the costs involved in supplying a large selection of book titles to individual book retailers by substantially eliminating the costs involved in the shipping the books from the publishers to the retailers.

The point of distribution book bank 154 comprises a laser writing subsystem (not shown) for encoding information on the exterior surfaces of the compact cylinders 24. As explained earlier, each of the compact cylinders 24 is formed from a plastic material such as a polystyrene 142, and an outer covering 144 that retains digital data encoded in the covering by the book bank laser writing subsystem. The outer covering is formed from a cross linked polymer material such as irradiated polyolefin. Data to be written on the cylinders is encoded in digital form in logic highs and lows on the laser discs provided by the central computer location 152. The book bank 154 reads the digital information from the laser discs and supplies the information to the laser writing subsystem. When the book bank reads a logic high from the laser disc it controls the laser writing subsystem to increase power supplied to the laser. The laser itself is directed at the compact cylinder surface and the increase in power to the laser causes it to exceed the damage threshold of the outer covering material of the compact cylinder. This results in melting and subsurface puddling of the cylinder outer covering at the bottom of extremely small blind holes in the order of less than 50 microns in diameter. When the book bank detects a logic zero or false condition in the digital data encoded in the laser disc, it reduces the power of the laser to a level below the damage threshold of the compact cylinder outer layer. At such a power level, the laser is not capable of melting and puddling the outer covering material of the compact cylinder.

The puddled material in the outer layer of a compact cylinder is extremely reflective to electro-magnetic energy in the visual spectrum, and thus represents a logic "1" or "true" condition whereas adjacent areas represent logical "0" or a "false" condition in a binary mechanical array. Sequential or serial digital data is written in the outer layer of the compact cylinder along the longitudinal axis in this manner. Because of the extremely small size of the reflective holes formed in the cylinder surface by the laser writing subsystem, a substantial amount of digital data can be encoded in the surface of a compact cylinder by the book bank 154. In order to protect the holes or pits formed in the surface of the cylinder by the book bank, a transparent layer of material is applied over the surface of the cylinder after it has been encoded with data.

The point of distribution book bank 154 is also capable of encoding digital data from the laser disc on the memory modules 22 of the personal library apparatus. The memory modules 22 are encoded with information in substantially the same manner as conventional solid state memory modules. Because the memory modules have a lesser memory capacity than the compact cylinders, only a fraction of the information that is capable of being encoded on the surface of the compact cylinder 24 may be encoded in the solid state memory modules 22.

The encoded compact cylinder 24 is inserted into the cylinder reader module 28 and is secured in position by locking the locking key 152 in the opening 90 of the reader module housing 28 as explained earlier. The operator of the personal library apparatus next depresses the "ON" keyboard key 54 to actuate the apparatus.

In the preferred embodiment of the invention, the text of a book is recorded or programmed onto the compact cylinder (CC) 24 by the interfacing information network. The exterior surface of the CC 24 is etched with a series of laser inscribed holes 146 or unholed surface areas 148 representing logic "true" or "false" digital data by the book bank of the information network, thereby recording digital information on the CC that is transformed and downloaded by the cylinder reader 28 and communicated to the reader control 20 for a display on the LCD screen 48 as printed text, graphs and/or drawings. Each individual CC 24 has the capacity of storing digital information for 25–30 books. On the other hand, the memory modules 22 have a smaller storage capacity. Each memory module stores up to eight megabytes of information. However, unlike the CC 24 and CC reader 28, the memory modules 22 are removable from the notebook enclosure 12 and transportable with the reader control unit 20.

Data recorded on the compact cylinder 24 is read off the cylinder by the cylinder reader 28 and is transmitted to the control unit 20 by way of the notebook enclosure bus communicating the reader with the control unit. Information can only be downloaded to the control unit 20 when the unit is inserted into the notebook enclosure 12 and connected with the bus. The control unit 20 then downloads a portion of the information available from the cylinder 24 into the memory module 22 inserted in the slot interface 82 of the control unit.

The microprocessor control system of the reader control unit 20 controls the electronic personal library apparatus 10 to sequentially read in segments of stored data from the memory module 22 or CC 24 each time a new screen of information is to be displayed on the LCD screen 48. The automatic reading in of sequential segments of stored data is controlled by the microprocessor. The microprocessor controls the starting and stopping of the read in function of the apparatus to sequentially read in separate segments of text data, and display the read in data on the display screen. The rate at which the data is displayed is dependent on the setting of the configuration control 74. When the power off control 56 of the control unit is turned off during the retrieval and display of data stored in the memory module, the microprocessor control of the apparatus automatically stores in its memory the location of the last segment of data retrieved from the module. When operation of the apparatus is once again initiated, the microprocessor control system locates the point in the sequence of data stored by the memory module where the read in and display functions of the apparatus were stopped, and controls the apparatus to read in and display data in sequence from this point forward. When a memory module is removed from and then reinserted into the control unit 20, the microprocessor controls the read in and display functions to read in and display data beginning at the start of the data sequence stored in the memory module. If it is desired to advance through the information stored in the memory module to a desired page, the operator of the apparatus may input the desired page number by depressing the appropriate numbered keys 76.

The microprocessor control system 90 of the reader control unit 20 is shown schematically in the block diagram of FIG. 9. The operations of the control system are controlled by a H8/322 microprocessor central processing unit (CPU) 91 or a functionally similar device. The H8/322 CPU 91 controls the data lines 92 and control lines 93 to all other supporting circuitry units of the control system as shown in FIG. 9. A 62256 random access memory (RAM) 94 or functionally similar device is loaded with a system operating program on power up of the control unit. The 62256 RAM 94 functions as a memory storage device for book text data received from a memory module during READ operations performed by the control unit. A 74HC245 data transceiver 95 communicates with the RAM 94 and controls book text data traffic on the data bus 92 as well as the direction of data traffic on the bus. The data transceiver 95 also provides a signal conditioning function of data signals carried on the bus 92. The two ports A and B represent connections of the data bus 92 to the control system circuitry of the LCD display and the memory module. The 74273 data latch 96 stores data input by manual operation of the keyboard 50 until the central processing unit 91 is ready to read the data from the latch. The 74HC138 line decoder 99 decodes three address lines 100 into eight control lines 101. The control lines 101 are used primarily for controlling the memory module central processing unit (CPU) communicating with the ports A and B. The SE303A–C diode 104 is an infrared diode used for infrared communication with a separate printer (not shown) having an infrared signal receptor. The infrared diode 104 is used for sending control signals to the printer to control printing operations of the printer by way of remote control signals. The 2N2222 diode driver 105 functions with the infrared diode 104 to control the transmission of infrared signals by the diode. The MC144111DW is a digital to analog (DAC) converter 106 provided in the audio section 107 of the reader control unit. The digital to analog converter 106 converts digital signals received from the microprocessor CPU 91 to an analog signal that is used to produce audible speech by the reader control unit. The MC34119 audio amp 108 amplifies the output of the digital to analog converter 106 to a level that is perceptible by the user of the control unit. The 32 KHz crystal 109 and the DS1202S clock synchronizer 110 make up the real time clock 111 of the reader control unit control system explained earlier, the real time clock 111 provides a control signal to the microprocessor CPU 91 that is compared by the microprocessor to programmed date data received from a memory module connected to the memory module ports B of the control unit. The programmed date data is compared with the date data signal produced by the real time clock 111 in the determinations performed by the microprocessor CPU 91 as to whether the programmed time period of the memory module has expired and the data programmed in the memory module should be effectively erased. The 4.9 µHz crystal 112 is the control unit control system operating clock. The transformer 113 provides 115 volts of alternating current to a 6 volt of DC current transformation. The LT1073 and LT1173-5 regulators 114 are employed in the control system to provide the entire system with an exact DC voltage (raw power). A filter 115 is also used to remove any undesired signals from the raw power supplied by the transformer 113 and regulators 114. From the filter 115, raw power is supplied to all the circuitry of the control unit control system 90.

Figure 10:
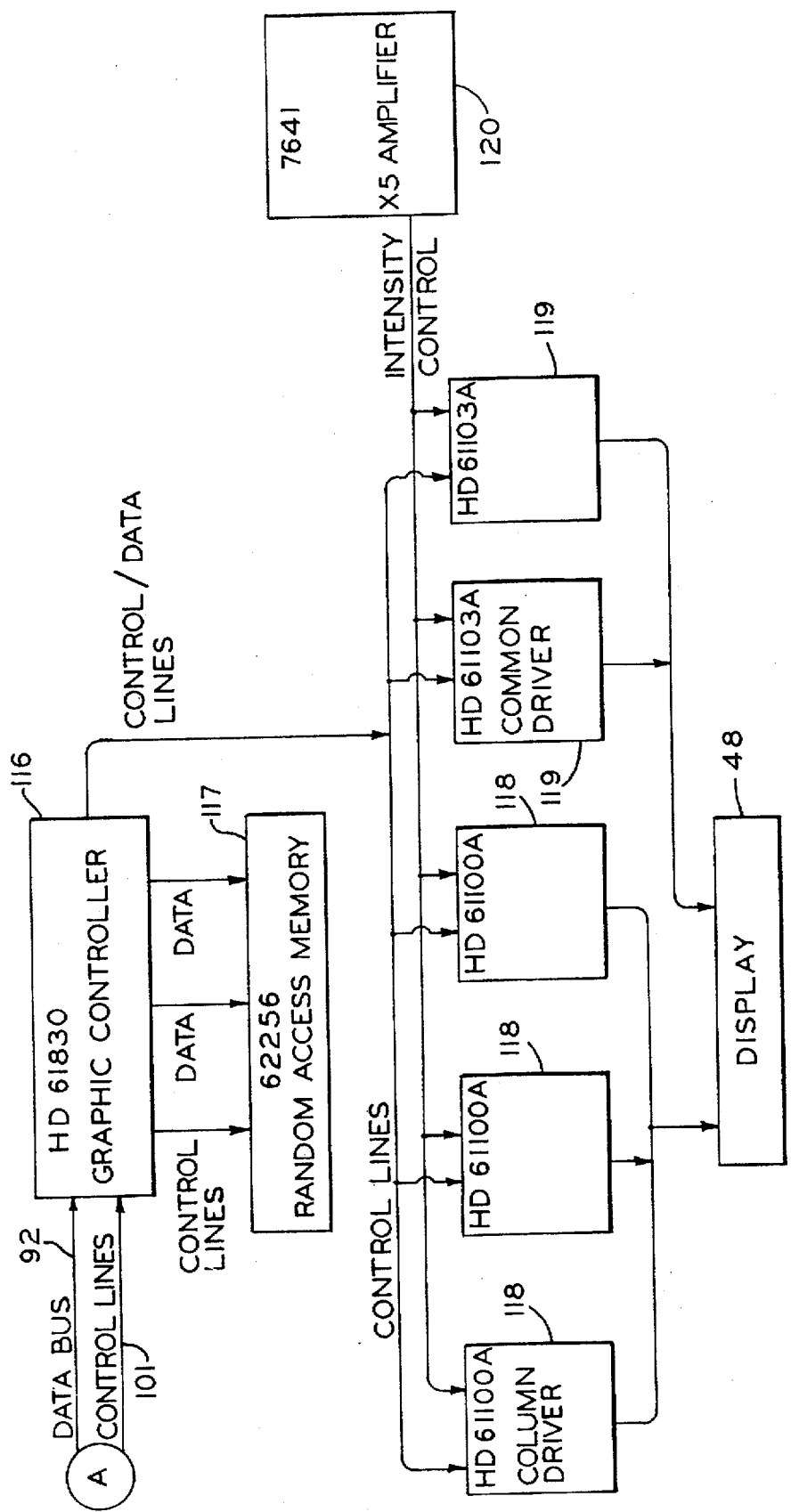
FIG. 10 is a schematic block diagram of the electronic circuitry of the Liquid Crystal Display of the control unit of the apparatus.

The control system circuitry of the LCD display board 48 contained in the control unit 20 is shown in the schematic block diagram of FIG. 10. In the display board circuitry, the HD61830 graphic controller 116 receives data signals from the microprocessor CPU 91 of the control unit 20 conveyed over the data bus 92 and control lines 101 communicating with the control unit CPU. The operation of the graphic controller 116 is controlled by the control unit microprocessor CPU 91 in accordance with command signals conveyed by the control lines 101 from the CPU. The graphic controller 116 down loads the data received from the CPU 91 into a 62256 random access memory (RAM) 117 where the data downloaded is stored until it is controlled to be read back into the graphic controller 116 by control signals provided by the controller. The graphic controller 116 then sends control and data signals along control/data lines to the HD61100A column drivers 118 and the HD61103A common driver 119. At the column drivers 118 and the common driver 119, power levels for data to be displayed on the display screen 48 are brought up to the power levels required by the display screen and the drivers output the data signals to the display screen. Five of the 7641 amplifiers 120 provide the amplification necessary for the intensity control of the display drivers in response to an intensity command input by the control unit operator at the control unit keypad.

FIG. 11 shows a schematic block diagram of the electronic circuitry of the memory modules 22. In the memory module control circuitry, the H8/322 microprocessor central processing unit (CPU) 121 performs control functions over data received from the control unit microprocessor CPU 91 along the data bus 92 and control lines 101 of the control unit. The microprocessor CPU 121 controls the transmission of data over the data bus 92 and control lines 101 and receives data signals from and sends signals to the control unit microprocessor CPU 91. The 74HC245 data transceiver 95 shown in the schematic of FIG. 11 is the same data transceiver of the control unit shown in FIG. 9. The 4 µHz crystal 122 is the memory module system operating clock that is programmed on programming of data into the memory module with a set time period that is compared at the real time clock 111 of the control unit to determine whether or not the control unit should effectively erase the data programmed in the memory module as explained earlier. The 93C46 serial EE programmable read only memory (EEPROM) 123 contains configuration data for the operation of the memory module microprocessor CPU 121. The 74HC138 line decoder 124 decodes three address lines 125 to four control lines 126 that are used for control of the memory module flash memory 127. The E28F020 flash memory 127 stores operating system data for controlling operation of the memory module as well as programmed book text data. In each of the block diagrams of FIGS. 9–11 discussed above, the electronic circuit components described may be replaced by functionally equivalent devices and those described are illustrative only.

In operation, the electronic personal library apparatus 10 of the present invention is capable of downloading the digital information stored on a compact cylinder 24 and translating the information to a visual display of alphanumeric characters, graphs and/or drawing figures on the LCD display screen 48 of the unit. The information is displayed in a format of several vertically spaced horizontal lines of characters, or in a format of several lines of characters with a graph or drawing figure also being displayed on the screen.

On inserting a recorded compact cylinder 24 into the cylinder reader 28 and inserting a memory module 22 into the module interface slot 82 of the control unit 20, and on actuating the POWER ON key 54 of the manual controls 50, the electronic personal library apparatus is activated and ready to download and display on the LCD screen 48 information encoded on the compact cylinder 24. With the electronic personal library apparatus 10 activated, the user next depresses the menu key 72 to command the apparatus to retrieve the titles of books that have been recorded on the compact cylinder 24 and display the titles on the LCD screen 48. Each of the recorded titles are displayed on the LCD screen 48 along with page numbers adjacent the titles of pages in each book that have been last accessed by the apparatus user. This book mark function of the apparatus enables the user to easily return to a page of a book he was last reading when the apparatus was turned off. The user then looks over the list of titles and chooses the title desired for use by manipulating the cursor keys 62, 64, 66, 68 to position a cursor displayed on the screen 48 adjacent the desired title. By depressing the enter key 58 the selected title will then be downloaded from the compact cylinder 24 by the cylinder reader 28 and transmitted through the interconnecting bus (not shown) to the control unit and recorded on the memory module 22 inserted in the interface slot 82 of the unit. If the memory needed to download the entire book title selected is in excess of the capabilities of the memory module 22, then the reader control unit 20 must remain directly linked via the network bus (not shown) to the cylinder reader 28 when in operation to take advantage of the larger storage capacity of the compact cylinder 24 inserted in the reader.

If the additional storage capacity of the compact cylinder 24 is not needed and the information desired to be retrieved is stored in a memory module 22 inserted in the interface slot 82 of the reader control unit 20, the reader control unit 20 and inserted memory module 22 may be removed from the notebook enclosure 12 to enable the unit and module to be easily transported separate from the CC reader 28 and the notebook enclosure 12.

With the desired book title downloaded from the CC 24 into the memory module 22, the user next depresses the configuration key 74 on the keypad. The configuration key 74 is software controlled to display a configuration menu on the display screen 48 of the control unit. A schematic representation of the configuration menu displayed on the display screen is shown in FIG. 12. As seen in FIG. 12, the configuration control 74 displays on the display screen 48 information to control the manner in which the data downloaded from the CC is presented to the user on the display screen. With the configuration menu displayed, the apparatus operator manipulates the up and down cursor keys 68, 64 to control the position of a cursor 130 along the left margin of the configuration menu display. By positioning the cursor 130 adjacent a configuration title the apparatus operator may adjust the characteristics of that configuration in the data display. The cursor 130 is shown in FIG. 12 positioned adjacent the configuration characteristic DISPLAY INTENSITY. With the cursor so positioned the apparatus operator selectively depresses the space key 78 a desired number of times to increase the display light intensity. A visual indication of the display intensity is provided by a horizontal bar graph 131 displayed on the screen immediately to the right of the display characteristic. By selectively depressing the space keyboard key 78 and the back space keyboard key 80, the apparatus operator may adjust the desired intensity of the display screen.

Next the apparatus operator depresses the downward cursor 64 to cause the cursor 130 to move downward one space adjacent the SCROLL SPEED configuration characteristic. Again, with the cursor adjacent the SCROLL SPEED characteristic, the apparatus operator manipulates the space keyboard key 78 and the back space keyboard key 80 to adjust the desired scroll speed of the data displayed on the display screen 48. A horizontal bar graph 132 adjacent the right side of the SCROLL SPEED characteristic provides a visual indication of the speed of adjustment selected by the apparatus operator.

The same adjustments as described above are made for the AUDIO VOLUME configuration characteristic. This control adjusts the volume of the speech synthesizer heard through the head phones 32 of the apparatus.

With the cursor positioned adjacent the SCROLL TYPE configuration characteristic, either the page, line, or smooth scroll types are selected by manipulation of the space key 78 and the back space key 80 to position an indicator displayed on the screen over one of the three choices of scroll type.

The particular type of EDIT MODE is chosen in the same manner as the scroll type. The cursor is moved adjacent the EDIT MODE configuration characteristic and an indicator displayed on the screen is manipulated by the space key 78 and back space key 80 over the ADD type of editing which enables the operator to edit portions of the displayed text among the entire text displayed on the screen 48, the ONLY type of editing which enables the operator to display only edited portions of the text on the display screen 48, or the OFF type which completely disables the edit mode of the apparatus.

With the cursor positioned adjacent the POWER UP TASK, a maintenance check is made on component parts of the apparatus to ensure that they are fully operational. For example, on selecting the POWER UP TASK configuration characteristic by positioning the cursor adjacent this characteristic, and then depressing the enter key, a maintenance check is automatically performed. If a system component, for example battery strength, is insufficient, a warning message is displayed adjacent the right side of this characteristic.

With the cursor positioned adjacent the ZOOM configuration characteristic, the apparatus operator is able to position an indicator displayed on the screen over the ON or OFF selections by manipulation of the space and back space keys 78, 80 to select the ZOOM function. With the ZOOM function turned on, the type size displayed by the display screen 48 is magnified.

Positioning the cursor adjacent the BACK LIGHTING configuration characteristic and manipulating the space and back space keys 78, 80 to the desired ON or OFF selection, back lighting of the display screen 48 is selected.

Positioning the cursor next to the PRINTER configuration characteristic and then depressing the enter 58 keyboard key controls the control unit microprocessor CPU 91 to output information from the infrared diode 104 of the control unit. The information output by the infrared diode is receivable by a separate printer having an infrared receptor for controlling the printer to print out the text data displayed on the display screen 48.

Positioning the cursor next to the VIDEO ADAPTER configuration characteristic and then depressing the enter 58 key enables the display of the display screen 48 to be simultaneously displayed on a separate video module connected with the video module output port of the control unit.

Positioning the cursor adjacent the MODEM ADAPTER configuration characteristic and then depressing the enter keyboard key 58 enables the apparatus to transmit data displayed on the display screen 48 over a telephone modem that has been interconnected at the video adapter output port of the apparatus.

Positioning the cursor adjacent the INPUT DEVICE control characteristic enables the apparatus operator to inform the control unit of the type of data being supplied to the control unit. On positioning the cursor adjacent the INPUT DEVICE characteristic a indicator is displayed on the display screen and is movable by manipulation of the space and back space keys 78, 80 over the three types of input data. This enables the apparatus operator to inform the control unit that it is being supplied with data from either a CC, a random access memory source, or a flash memory source.

Once each of the desired configuration characteristics are selected and input into the control unit by the apparatus operator in the manner described above, the operator next depresses the READ 70 key and the control unit microprocessor CPU 91 controls the apparatus to begin displaying data input into the memory module 22 as printed text on the display screen 48 of the apparatus. The manner in which the text is displayed on the display screen 48 is automatically controlled by the control unit microprocessor CPU 91 according to the input parameters of the configuration menu selected and input by the apparatus operator. When the apparatus operator is finished reading text material displayed on the display screen 48, he merely depresses the OFF key 56 to completely disable all of the functions being performed by the apparatus of the invention 10.

FIG. 13 shows a schematic flow chart representation of the control functions performed by the control unit microprocessor CPU 91 following POWER UP of the control unit. On actuation of the ON keyboard key 54 or POWER UP 200, the microprocessor software first checks to see if the set up is valid 202. The set up includes adjustment of the display intensity, scroll speed, audio volume, scroll type, etc., input by the apparatus operator after depressing the configuration key 74 as explained above. If the set up is not valid, the software program defaults to a default set up 204.

If the set up is valid, the program loads the set up program from the control unit random access memory 206 and then checks to see if a power up read flag is set 208. The power up read flag is set by the apparatus operator depressing the READ keyboard key 70. If the power up read flag is set, the software program determines which book title has been selected by the apparatus operator and then determines if there is a valid book mark 210. If a valid bookmark is found, the program opens the book to the bookmark by identifying the point among the input data where the bookmark has been set 212. If the bookmark is determined to be not valid, the software program displays the menu of book titles available 214.

If the check of the power up read flag determines that the flag is not set, the program checks to determine if the menu flag is set 209. If the menu flag is not set, the program allows the configuration characteristics to be set up by the apparatus operator 216. If the menu flag is determined to be set, the program displays the menu of book titles available 214 and allows the apparatus operator to select a book title and page number 222.

If the configuration menu set up is found to be not valid 202, the program allows the display configuration to be set up by the apparatus user through manipulation of the keyboard keys as explained earlier 216. The program then determines if the READ keyboard key 70 has been depressed by the apparatus operator 218. If the READ keyboard key has been depressed, the program determines whether a valid bookmark has been set 210, and then proceeds in the same manner as explained earlier.

If the read key has not been depressed by the apparatus operator, the program determines if the menu key 72 has been pressed 220. If the menu key has not been depressed, the program returns to allow the configuration of the display screen by the apparatus operator 216. If the menu key has been pressed, the program displays the menu of book titles available on the LCD screen 214 and allows the selection of a book title and a page number by the apparatus operator 222.

The program next determines whether the read key 70 has been depressed by the apparatus operator 224. If the read key has been pressed, a bookmark is set 226 and the book data is accessed at the bookmark page 212. If the read key 70 has not been pressed by the apparatus operator, the program determines whether the configuration key 74 has been pressed by the operator 228. If the configuration key has not been pressed, the program returns to the display of the menu of book titles 214. If the configuration key 74 has been pressed, the program returns to the point of allowing the input of a desired display configuration of the control unit LCD display via the keyboard keys 216.

Once a bookmark is set in the text data and the book data opened to the bookmark 212, the LCD screen 48 displays the book text data 230. The program monitors the scroll time 232 and advances the displayed page 234 if the scroll time is determined to be up or if the user presses the enter key 236. The apparatus user may at any time press the configuration key 74 to control the program 238 to return the user to the configuration menu display of the control unit 216 to enable the user to adjust the configuration via the keyboard keys 50 as explained above. The apparatus user may also at any time press the menu key 72 to control the program 240 to return the apparatus user to the menu display of available book titles 214 as was explained earlier.

Once a selection from the menu of book titles displayed on the LCD screen is made by the apparatus operator positioning the cursor adjacent the book title and depressing the read key 70, the apparatus user sets a bookmark 226 and accesses the book text data at the desired page 212 and displays the text data of the book on the display screen 230.

While the apparatus user reads the displayed text data, the control program continuously checks for scroll time up 232. The bookmark is automatically advanced if either the scroll speed time has expired or the user presses the enter key 236. The user may also at any time press the configuration key to control the program 238 to again display the configuration menu on the LCD screen 216 as explained above. The user may also at any time press the menu key 72 to control the program 240 to allow the user the select from the menu of book titles available 214.

While the present invention has been described by reference to specific embodiments, it should be understood that modifications and variations of the invention may be constructed without departing from the scope of the invention defined in the following claims.

What is claimed is:

1. An electronic personal library apparatus for use in a system for providing, on an accountable basis, user requested library information for display, the system including a transportable data storage medium, a centralized computer having a central information storage bank in which may be entered and stored various selectable items of library information, in electronic form, and a localized book bank unit communicatively coupled to said centralized computer, the book bank unit including a book bank memory for receiving and storing selected library information provided from the central information storage bank of the centralized computer, an interface adapted to engage the data storage medium and to communicate thereto user requested library information from the selected library information provided from the central information storage bank of the centralized computer to the book bank unit, the user requested library information communicated from the book bank unit to the data storage medium being time encoded, and a processor for controlling such communication of the requested library information to the book bank unit and the exchange of accountability data with the centralized computer, said electronic personal library apparatus comprising:

a display, an interface adapted to engage the user's data storage medium, a keypad input unit, and a microprocessor, said microprocessor programmed to limit access to the user requested library information communicated from the book bank unit to the data storage medium in accordance with the time encoded information transmitted with the information, said electronic personal library apparatus operable to display, in response to data entered by a user at said keypad input unit, desired library information from the library information communicated to the data storage medium.

2. The electronic personal library apparatus of claim 1 wherein said apparatus is configured to be a transportable hand-held unit and including a rechargeable battery.

3. The electronic personal library apparatus of claim 1 wherein the library information communicated thereto is audio information, said electronic personal library apparatus further comprising a speaker for producing an auditory representation of the audio information.

4. The electronic personal library apparatus of claim 3 further comprising including headphones, said speaker being associated with said headphones.

5. The electronic personal library apparatus of claim 1 wherein the data storage medium comprises a compact cylinder having a surface adapted to react to the controlled application of lased light thereto to effect the encoding of information on the compact cylinder, the interface of the book bank unit including a laser writing system operable to effect the encoding of the user requested library information on the compact cylinder, said interface of said electronic personal library apparatus including a cylinder reader for reading the encoded information on the compact cylinder.

6. The electronic personal library apparatus of claim 5 wherein said cylinder reader includes a light source and a light detector circuit including a laser diode operable to detect the encoded information on the compact cylinder.

7. The electronic personal library apparatus of claim 1 wherein the user's data storage medium is adapted to include thereon a machine readable code associated with the user and said apparatus is operable to display information stored on the user's data storage medium only if the code is an authorized code.

8. The electronic personal library apparatus of claim 1 wherein the data storage medium comprises a memory module including a random access memory adapted for storing digital information, said interface of said electronic personal library apparatus including a digital reader circuit for reading the digital information stored in the memory module.

9. An electronic personal library apparatus for use in a system for providing, on an accountable basis, user requested library information for display, such system including a transportable data storage medium, a centralized computer having a central information storage bank in which may be entered and stored various selectable items of library information, in electronic form, and a localized book bank unit communicatively coupled to said centralized computer, the book bank unit including a book bank memory for receiving and storing selected library information provided from the central information storage bank of the centralized computer, an interface adapted to engage the data storage medium and to communicate thereto user requested library information from the selected library information provided from the central information storage bank of the centralized computer to the book bank unit, the user requested library information communicated from the book bank unit to the data storage medium being time encoded, and a processor for controlling such communication of the requested library information to the book bank unit and the exchange of accountability data with the centralized computer, said electronic personal library apparatus comprising:

a display, an interface adapted to engage the user's data storage medium, a keypad input unit, and a microprocessor, said microprocessor programmed to limit access to the user requested library information communicated from the book bank unit to the data storage medium in accordance with the time encoded information transmitted with the information, said electronic personal library apparatus operable to display, in response to data entered by a user at said keypad input unit, desired library information from the library information communicated to the data storage medium by the book bank unit, and wherein the user's data storage medium is adapted to include thereon a machine readable code associated with the user and said apparatus is operable to display information stored on the user's data storage medium only if the code is an authorized code.

10. The electronic personal library apparatus of claim 9 wherein the data storage medium comprises a compact cylinder having a surface adapted to react to the controlled application of lased light thereto to effect the encoding of information on the compact cylinder, the interface of the book bank unit including a laser writing system operable to effect the encoding of the user requested library information on the compact cylinder, said interface of said electronic personal library apparatus including a cylinder reader for reading the encoded information on the compact cylinder.

11. The electronic personal library apparatus of claim 10 wherein said cylinder reader includes a light source and a light detector circuit including a laser diode operable to detect the encoded information on the compact cylinder.

12. The electronic personal library apparatus of claim 9 wherein the data storage medium comprises a memory module including a random access memory adapted for storing digital information, said interface of said electronic personal library apparatus including a digital reader circuit for reading the digital information stored in the memory module.

13. A system for providing library information, on an accountable basis, from a centralized source to a user having an electronic personal library apparatus that includes a removable, transportable data storage medium and a display for displaying information stored on such data storage medium, said system comprising:

a centralized computer including a central information storage bank in which may be entered and stored various selectable items of library information, in electronic form, and a localized book bank unit communicatively coupled to said centralized computer, said book bank unit including a book bank memory for receiving and storing selected library information provided from said central information storage bank of said centralized computer, an interface adapted to engage the user's data storage medium and to communicate thereto user requested library information from the selected library information provided from said central information storage bank of said centralized computer to said book bank unit, and a processor for controlling such communication of the requested library information to said book bank unit and the exchange of accountability data with said centralized computer, said book bank unit configured to time encode the requested library information communicated to the user's data storage medium so as to limit access thereto by the user to a limited time period.

14. The system of claim 13 wherein the user's data storage medium is adapted to include thereon a machine readable code associated with the user and wherein said book bank unit is operable to communicate the requested library information only to a user's data storage medium including an authorized code.

15. The system of claim 13 including an electronic personal library apparatus that includes a display, an interface adapted to engage the user's data storage medium, a keypad input unit, and a microprocessor, said electronic personal library apparatus operable to display, in response to data entered by a user at said keypad input unit, desired library information from the library information communicated to the user's data storage medium by said book bank unit.

16. The system of claim 15 wherein said electronic personal library apparatus is configured to be a transportable hand-held unit including a rechargeable battery.

17. The system of claim 16 wherein the library information communicated to said electronic personal library apparatus includes audio information, said electronic personal library apparatus including a speaker for producing an auditory representation of the audio information.

18. The system of claim 17 wherein said electronic personal library apparatus includes headphones, said speaker being associated with said headphones.

19. The system of claim 15 wherein said electronic personal library apparatus further includes a data storage medium comprising a compact cylinder having a surface adapted to react to the controlled application of lased light thereto to effect the encoding of information on said compact cylinder, said interface of said book bank unit including a laser writing system operable to effect the encoding of the user requested library information on said compact cylinder, said interface of said electronic personal library apparatus including a cylinder reader for reading the encoded information on said compact cylinder.

20. The system of claim 19 wherein said cylinder reader includes a light source and a light detector circuit including a laser diode operable to detect the encoded information on said compact cylinder.

21. The system of claim 20 wherein said compact cylinder includes a main cylinder formed of polystyrene and a surface covering thereon of a cross-linked polymer material, said surface covering retaining digital data transcribed therein by the controlled application of lased light thereto.

22. The system of claim 21 wherein said cross-linked polymer material is irradiated polyolefin and said compact cylinder includes a transparent layer of material applied over the surface covering after data is transcribed therein.

23. The system of claim 15 wherein said electronic personal library apparatus further includes a data storage medium comprising a memory module including a random access memory adapted for storing digital information, said interface of said book bank unit including a transfer unit for transferring a copy of user requested library information stored in said book bank memory to said memory module, said interface of said electronic personal library apparatus configured to couple said memory module and said electronic personal library apparatus microprocessor.

24. A system for providing library information, on an accountable basis, from a centralized source to a user having an electronic personal library apparatus that includes a removable, transportable data storage medium and a display for displaying information stored on such data storage medium, said system comprising:

- a centralized computer including a central information storage bank in which may be entered and stored various selectable items of library information, in electronic form, and
- a localized book bank unit communicatively coupled to said centralized computer, said book bank unit including a book bank memory for receiving and storing selected library information provided from said central information storage bank of said centralized computer, an interface adapted to engage the user's data storage medium and to communicate thereto user requested library information from the selected library information provided from said central information storage bank of said centralized computer to said book bank unit, and a processor for controlling such communication of the requested library information to said book bank unit and the exchange of accountability data with said centralized computer, and wherein the user's data storage medium is adapted to include thereon a machine readable code associated with the user and wherein said book bank unit is operable to communicate the requested library information only to a user's data storage medium including an authorization code, said book bank unit configured to time encode the requested library information communicated to the user's data storage medium so as to limit access thereto by the user to a limited time period.

25. The system of claim 24 including an electronic personal library apparatus that includes a display, an interface adapted to engage the user's data storage medium, a keypad input unit, and a microprocessor, said electronic personal library apparatus operable to display, in response to data entered by a user at said keypad input unit, desired library information from the library information communicated to the user's data storage medium by said book bank unit.

26. The system of claim 25 wherein said electronic personal library apparatus is configured to be a transportable hand-held unit including a rechargeable battery.

27. The system of claim 25 wherein said electronic personal library apparatus further includes a data storage medium comprising a compact cylinder having a surface adapted to react to the controlled application of lased light thereto to effect the encoding of information on said compact cylinder, said interface of said book bank unit including a laser writing system operable to effect the encoding of the user requested library information on said compact cylinder, said interface of said electronic personal library apparatus including a cylinder reader for reading the encoded information on said compact cylinder.

28. The system of claim, 27 wherein said cylinder reader includes a light source and a light detector circuit including a laser diode operable to detect the encoded information on said compact cylinder.

29. The system of claim 27 wherein said electronic personal library apparatus further includes a data storage medium comprising a memory module including a random access memory adapted for storing digital information, said interface of said book bank unit including a transfer unit for transferring a copy of user requested library information stored in said book bank memory to said memory module, said interface of said electronic personal library apparatus configured to couple said memory module and said electronic personal library apparatus microprocessor.

* * * * *